(12) United States Patent
Cochran et al.

(10) Patent No.: US 12,485,856 B2
(45) Date of Patent: *Dec. 2, 2025

(54) BRAKING CONTROL SYSTEM AND METHOD FOR ARBITRATING BRAKE DEMANDS FROM A PLURALITY OF FOOT BRAKE MODULES

(71) Applicant: Bendix Commercial Vehicle Systems LLC, Avon, OH (US)

(72) Inventors: Joshua L. Cochran, Rocky River, OH (US); Ryan S. Hurley, Lakewood, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 704 days.

This patent is subject to a terminal disclaimer.

(21) Appl. No.: 17/877,347

(22) Filed: Jul. 29, 2022

(65) Prior Publication Data

US 2024/0034285 A1    Feb. 1, 2024

(51) Int. Cl.
*B60T 7/20*    (2006.01)
*B60T 7/04*    (2006.01)
(Continued)

(52) U.S. Cl.
CPC .............. *B60T 7/20* (2013.01); *B60T 7/042* (2013.01); *B60T 13/662* (2013.01);
(Continued)

(58) Field of Classification Search
CPC .......... B60T 7/20; B60T 7/042; B60T 13/662; B60T 17/221; B60T 2270/402; B60T 2270/82

See application file for complete search history.

(56) References Cited

U.S. PATENT DOCUMENTS

| 5,449,956 A | 9/1995 | Williams |
| 5,964,122 A | 10/1999 | Bonnard |

(Continued)

FOREIGN PATENT DOCUMENTS

WO    WO 2021/160567 A1    8/2021

OTHER PUBLICATIONS

"Everything under control with the dual control Econic"; downloaded from the Internet at https://special.mercedes-benz-trucks.com/en/econic/waste-management/everything-under-control-with-the-dual-control-econic.html; Daimler Truck AG; Aug. 27, 2021; 6 pages.

(Continued)

*Primary Examiner* — Pamela Rodriguez
(74) *Attorney, Agent, or Firm* — Crowell & Moring LLP

(57)    ABSTRACT

A braking control system is provided comprising a first brake controller configured to receive a first brake demand generated by a first brake pedal of a vehicle; and a second brake controller configured to receive a second brake demand generated by a second brake pedal of the vehicle. The first brake controller is further configured to provide the first brake demand to the second brake controller, and the second brake controller is further configured to determine which of the first brake demand and the second brake demand is greater. At least one of the first and second brake controllers is further configured to cause a braking system of the vehicle to decelerate the vehicle according to the greater brake demand. Other embodiments are possible, and each of the embodiments can be used alone or together in combination.

20 Claims, 14 Drawing Sheets

(51) Int. Cl.
  *B60T 13/66*   (2006.01)
  *B60T 17/22*   (2006.01)
(52) U.S. Cl.
  CPC ....... *B60T 17/221* (2013.01); *B60T 2270/402* (2013.01); *B60T 2270/82* (2013.01)

(56) References Cited

U.S. PATENT DOCUMENTS

| | | |
|---|---|---|
| 6,609,768 B1 | 8/2003 | Frank |
| 11,024,193 B1 | 6/2021 | Saxton |
| 12,036,972 B2 | 7/2024 | Hurley et al. |
| 12,233,832 B2 * | 2/2025 | Hurley ................... B60T 7/042 |
| 2013/0264139 A1 | 10/2013 | Braun |
| 2014/0012475 A1 | 1/2014 | Pallett |
| 2018/0297573 A1 | 10/2018 | Alam |
| 2021/0284117 A1 | 9/2021 | Boulivan et al. |
| 2022/0080935 A1 | 3/2022 | Terada et al. |

OTHER PUBLICATIONS

Non-final Office Action dated Aug. 20, 2024 in U.S. Appl. No. 17/877,272.

* cited by examiner

BRAKING CONTROL SYSTEM AND METHOD FOR ARBITRATING BRAKE DEMANDS FROM A PLURALITY OF FOOT BRAKE MODULES

BACKGROUND

Some vehicles are built with two driving positions, where both the traditional driver side and the traditional passenger side of the vehicle contain a steering wheel, acceleration pedal, and brake pedal. One example of such a vehicle is a commercial garbage truck, where the two-driving-position design is integrated into the truck by an original equipment manufacturer (OEM). The two-driving-position design allows the driver to choose which side of the truck to drive from. With this flexibility, the driver can choose to operate the truck on whichever side is closer to the curb to make it easier for the driver to get out of the truck and pick up refuse. In a purely-pneumatic anti-lock braking system (ABS), each brake pedal is connected to a pneumatic foot brake valve, and a pneumatic check valve selects the higher pressure supplied by the two pneumatic foot brake valves to apply to the braking system.

SUMMARY

In one embodiment, a braking control system is provided comprising a first brake controller configured to receive a first brake demand generated by a first brake pedal of a vehicle; and a second brake controller configured to receive a second brake demand generated by a second brake pedal of the vehicle. The first brake controller is further configured to provide the first brake demand to the second brake controller, and the second brake controller is further configured to determine which of the first brake demand and the second brake demand is greater. At least one of the first and second brake controllers is further configured to cause a braking system of the vehicle to decelerate the vehicle according to the greater brake demand.

Other embodiments are possible, and each of the embodiments can be used alone or together in combination.

DETAILED DESCRIPTION

As mentioned above, some vehicles are built with two driving positions, where both the traditional driver side and the traditional passenger side of the vehicle contain a steering wheel, acceleration pedal, and brake pedal. One example of such a vehicle is a commercial garbage truck, where the two-driving-position design is integrated into the truck by an original equipment manufacturer (OEM). The two-driving-position design allows the driver to choose which side of the truck to drive from. With this flexibility, the driver can choose to operate the truck on whichever side is closer to the curb to make it easier for the driver to see the curb and the garbage and/or to get out of the truck and pick up refuse. In a purely-pneumatic anti-lock braking system (ABS), each brake pedal is connected to a different/separate pneumatic foot valve, and a pneumatic check valve selects the higher pressure supplied by the two pneumatic foot brake valves to apply to the braking system.

While purely-pneumatic anti-lock braking systems (ABSs) are currently popular in North America, electronic braking systems (EBSs) are popular in Europe and are gaining in global popularity. An EBS, which is sometimes referred to as a "brake by wire" system, can provide a number of advantages over an ABS. In general, because an EBS uses electronic signals instead of pneumatic signals, an EBS can provide more precise, nuanced control of brakes as compared to an ABS. As compared to a pneumatic signal, an electronic signal is significantly faster (thus, can reduce braking response time and braking distance) and can provide additional information about the vehicle (e.g., from various sensors at each wheel) that can be relevant to a brake controller in braking the vehicle. Also, an EBS system can provide better capability for higher levels of autonomous driving functionality.

Figure 1:
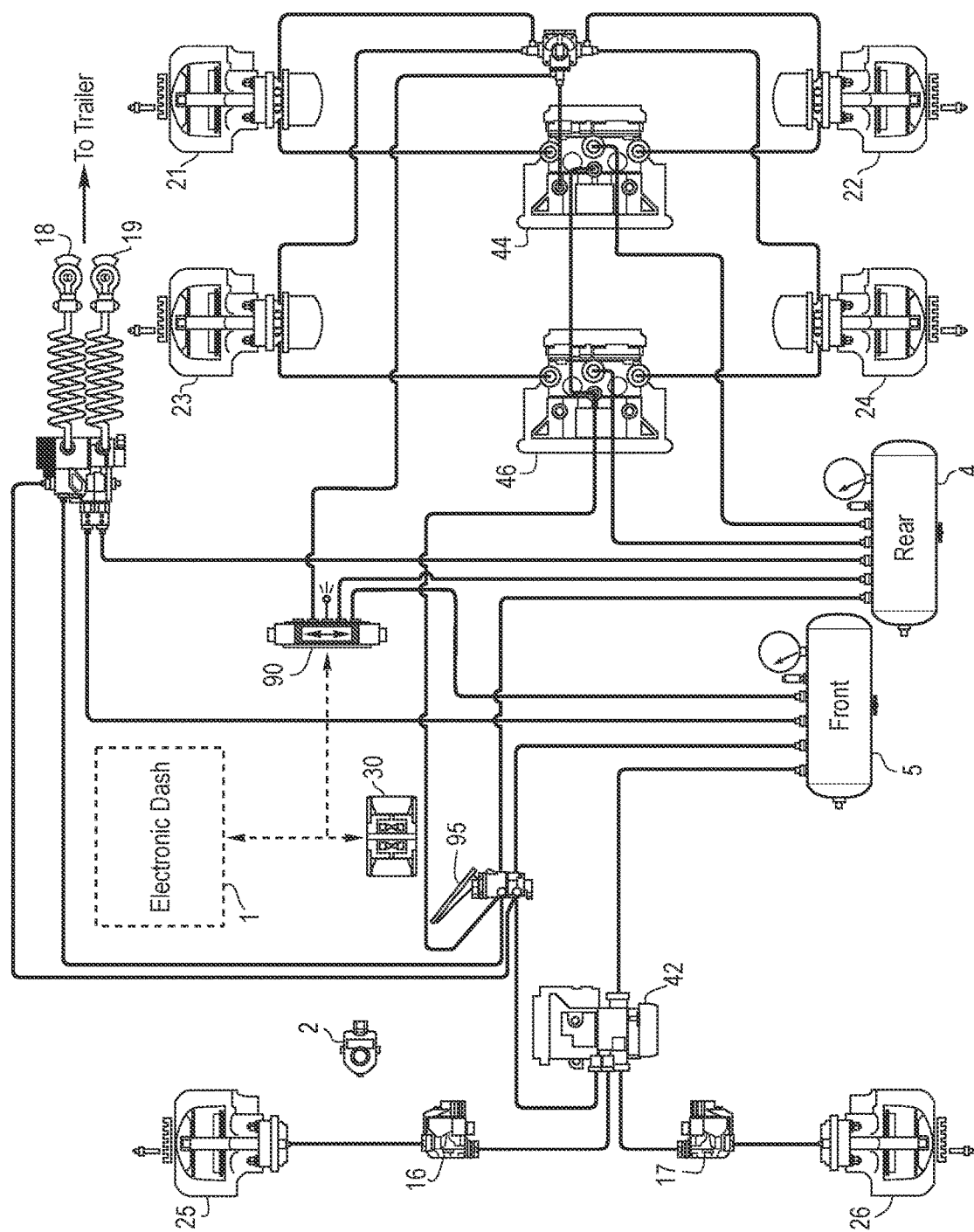
FIG. 1 is a diagram of a braking system of a vehicle of an embodiment.

FIG. 1 is diagram of an example vehicle that has an EBS. In this example, the vehicle is a tractor that has a rear drive axle, a front undriven (steer) axle (more than one steer axle can be used), and one or more optional axles (there can be zero additional axles, where the vehicle has a total of only two axles). The rear drive axle is driven by a drivetrain, which can include one or more of the following components: gas-powered motor(s), electric motor(s), batteries, transmission(s), differential(s), locking differential(s), and other such gear sets capable of changing rotational speeds. The number and location(s) of the motor(s) in the drivetrain can be selected in any suitable manner. While the vehicle in this example is a tractor that can tow a trailer, other vehicles (e.g., a garbage truck) can be used. Also, it should be noted that the details shown in FIG. 1 are just examples and that other configurations are possible.

To simplify the discussion of the operation of the EBS, a single foot brake module 95 is being used in this example. A vehicle with multiple foot brake modules will be discussed below. As used herein, a "foot brake module" is a device that comprises a brake pedal (or other type of actuator) and one or more sensors that measure how much stroke a driver indicates by pressing the brake pedal and transmit electronic signals representing that displacement, which represents a driver brake demand. In one embodiment, the foot brake module contains two sensors, one that increments up and one that increments down as the brake pedal is pressed. These two opposing signals can be used as an error detection mechanism, as a controller can detect an error if the two signals it receives from the foot brake module 95 are not opposing. Also, in one embodiment, the foot brake module 95 generates a signal even when the brake pedal is not pressed (such signal would represent zero braking). That way, if a controller receives no signal whatsoever from the foot brake module 95, the controller can assume there is a fault or error in the foot brake module 95 or communication channel (which, in one embodiment, is a direct, point-to-point communication channel, such as a universal asynchronous receiver-transmitter (UART) link). It should be understood that any suitable implementation of a foot brake module can be used, and a foot brake module can contain more or different components than those described herein.

In this embodiment, the signals from the foot brake module 95 are sent to a controller 30. The controller 30, which is sometimes referred to herein as an "electronic control unit (ECU)" or a "central ECU (CECU)," can take any suitable form, such as a (micro-) processor that executes computer-readable program code (e.g., firmware) stored in a computer-readable medium (e.g., in the controller or in another location). A controller can also take the form of a pure-hardware configuration using processing circuitry, logic gates, switches, an application-specific integrated circuit (ASIC), or a programmable logic controller, for example. The firmware and/or hardware of a controller can be configured to perform the various functions described below and shown in the flow diagrams. As shown in FIG. 1, the controller 30 can be in communication with an electronic dash 1 and a parking controller 90.

In operation, when the controller 30 receives the electronic brake demand signals from the foot brake module 95, the controller 30 maps the signals representing the displacement to a requested deceleration and commands electro-pneumatic modules (EPMs) 42, 44, 46 on the undriven, optional, and driven axles to apply the appropriate amount of pressure needed to achieve that deceleration given various variables, such as, but not limited to, vehicle weight, weight distribution, whether a trailer is present, and driving conditions. In an EBS, relays and modulators on an axle can be combined into an EPM, which is capable of electronically applying, holding, and releasing air to decelerate a wheel end of the axles. The EPMs 42, 44, 46 can cause the vehicle to decelerate in any suitable way. For example, in the embodiment shown in FIG. 1, the EPMs 44, 46 on the drive and optional axle are two-channel EPMs. EPM 44 communicates with friction brakes (here, air disc calipers 21, 22) on each braked wheel end of the steer axle, while EPM 46 communicates air disc calipers 23, 24 on each braked wheel end of the optional axle. The EPM 42 on the undriven axle in this example is a one-channel EPM that communicates, via modulators 16, 17, with air disc calipers 25, 26 on each braked wheel end of the undriven axle. Rear and front reservoirs 4, 5 can provide proportional pneumatic pressure to the EPMs 42, 44, 46. Pneumatic signals for braking can be applied to the trailer via the pneumatic control and supply lines 18, 19. The system also includes a steer-angle sensor 2.

As noted above, while the example EBS shown in FIG. 1 contains a foot brake module 95, it may be desired to include two (or more) foot brake modules 95 in the vehicle (such as when the vehicle is a refuse truck). Ideally, the controller 30 would simply accept electronic input signals from both foot brake modules and select which signals to use. However, in today's marketplace due to continued globalization and harmonization of product designs, existing EBS controllers are not designed to accept electronic input signals from more than one foot brake module, as the use of multiple foot brake modules is a relatively-niche application. Therefore, manufacturers and customers of vehicles are not able to purchase an off-the-shelf EBS controller for two-driving-position applications. Further, two-brake-pedal systems are unlikely to command a high sales volume, so a vehicle OEM is unlikely to incur the cost of redesigning the hardware of an EBS controller to accept two different foot brake modules. Additionally, in some environments, the communication protocol between the EBS controller and the foot brake module is a universal asynchronous receiver-transmitter (UART) protocol, which is mainly designed for a point-to-point communication. The nature of direct point-to-point connection does not allow for multiple nodes on the connection. So, if a second foot brake module is connected to this communication line, it will not work and force the system into a failsafe/limited-functionality mode. So, adding a second foot brake module to the same input on the EBS controller can cause many hardware and software integration challenges.

Figure 2:
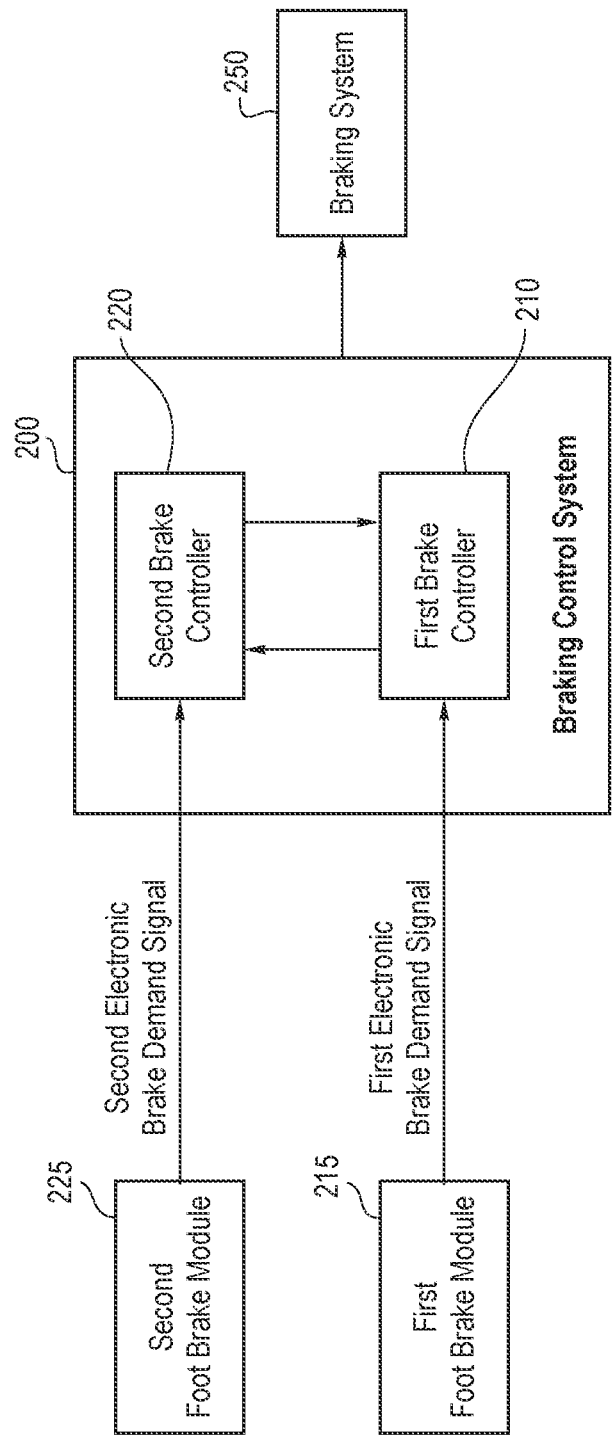
FIG. 2 is a block diagram of a braking control system of an embodiment.

The following embodiments can be used to allow the use multiple foot brake modules without having to change the hardware design of an existing EBS controller. In one embodiment (shown in FIG. 2), a braking control system 200 comprises first and second brake controller 210, 220. The first brake controller 210 is configured to receive a first electronic brake demand signal from a first foot brake module 215, and the second brake controller 220 configured to receive a second electronic brake demand signal from a second foot brake module 225. (Since a brake demand (even a demand for zero braking) can be generated by pressing (or not pressing) a brake pedal, it can be said that a brake demand signal is received or is generated by a brake pedal, even though other components of a foot brake module, if used, may be involved.) The first brake controller 210 is further configured to provide the first electronic brake demand signal received from the first foot brake module 215 to the second brake controller 220. The braking controller system 200 is scalable in that additional brake controllers can be added for additional foot brake modules (e.g., three brake controllers for three foot brake modules).

The second brake controller 220 is further configured to determine which of the two brake demand signals is greater and cause the greater brake demand signal to be applied a braking system 250. (The braking system 250 can include at least some of the components shown in FIG. 1 or other components.) This can be performed in any suitable way.

For example, in one implementation, the second brake controller 220 informs the first brake controller 210 which demand signal to use, and both the first and second brake controllers 210, 220 communicate with different components of the braking system 250 (e.g., the first brake controller 210 can communicate with EPMs or other braking components at the rear wheel ends, and the second brake controller 220 can communicates with EPMs and other braking components at the front wheel end). In another embodiment, only one of the first and second brake controllers 210, 220 communicates with the braking system 250 to cause braking. Other configurations are possible. Also, it should be noted that after arbitration of the braking signal, the braking control system 300 or another component in the vehicle can override or modify this signal due to downstream system parameters (e.g., from a cruise control system).

Figure 3:
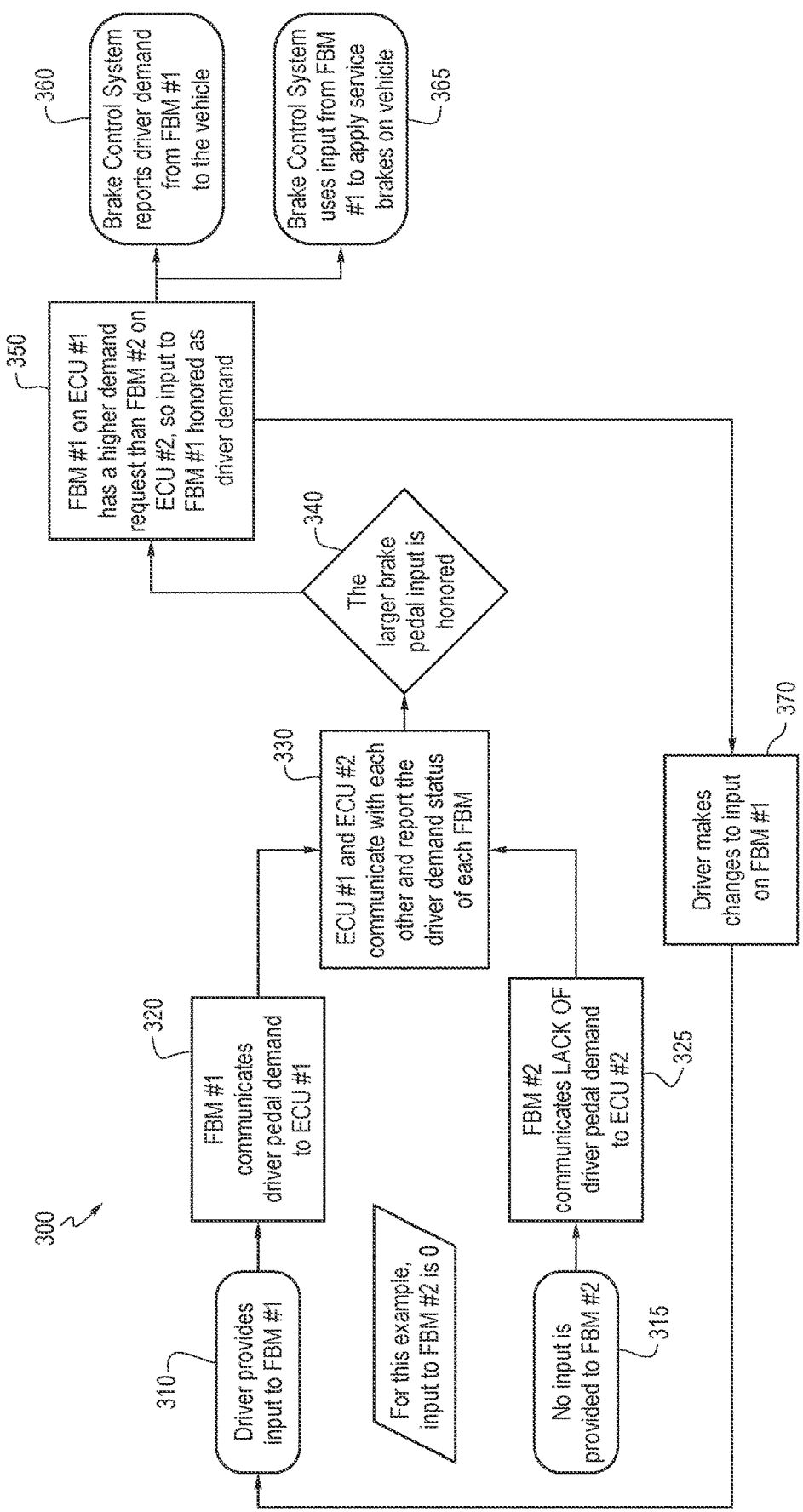
FIG. 3 is a flow chart of a method of an embodiment for arbitrating between two brake demand signals, where a first brake demand signal requests zero braking.
Figure 4:
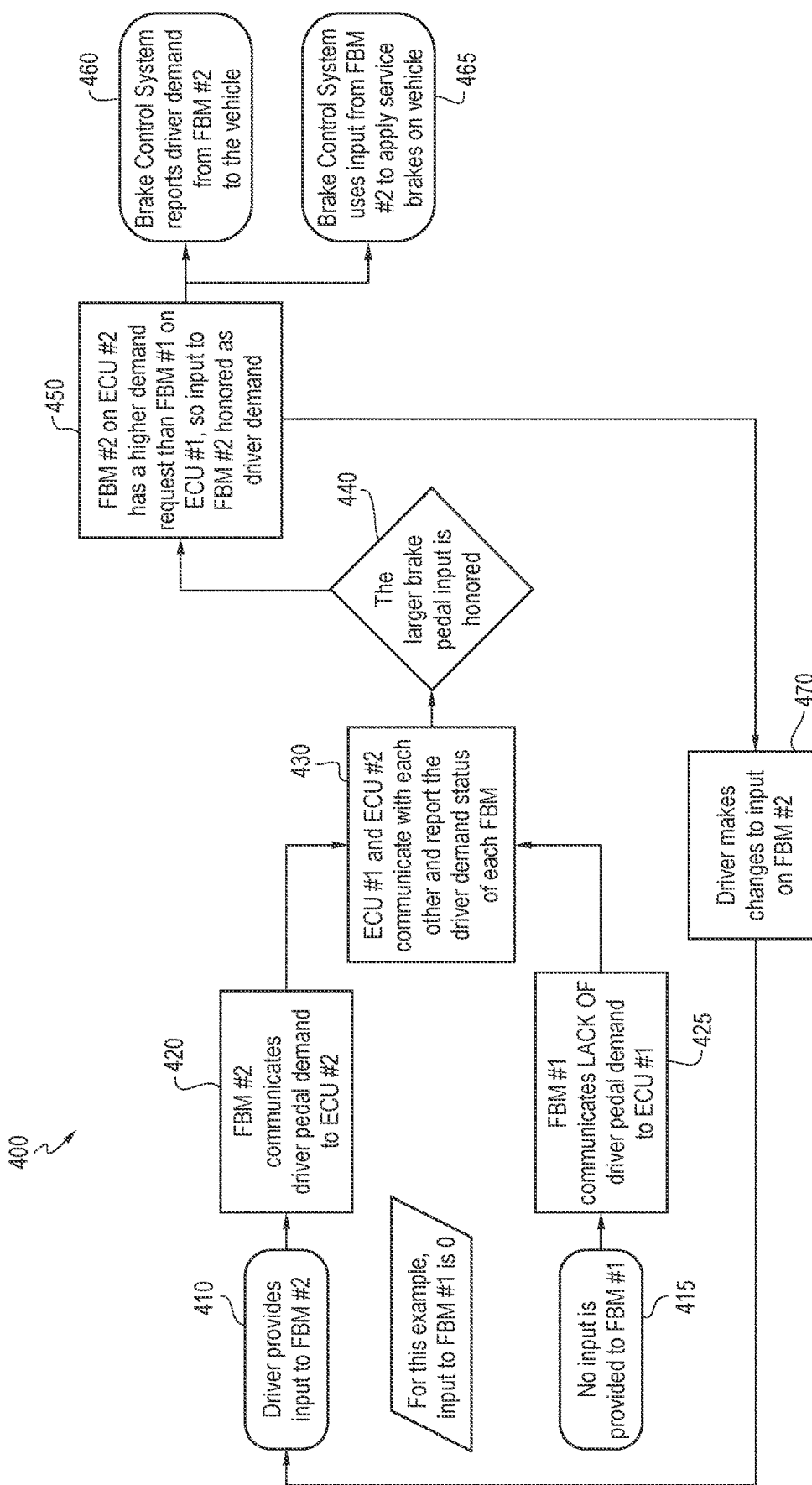
FIG. 4 is a flow chart of a method of an embodiment for arbitrating between two brake demand signals, where a second brake demand signal requests zero braking.
Figure 5:
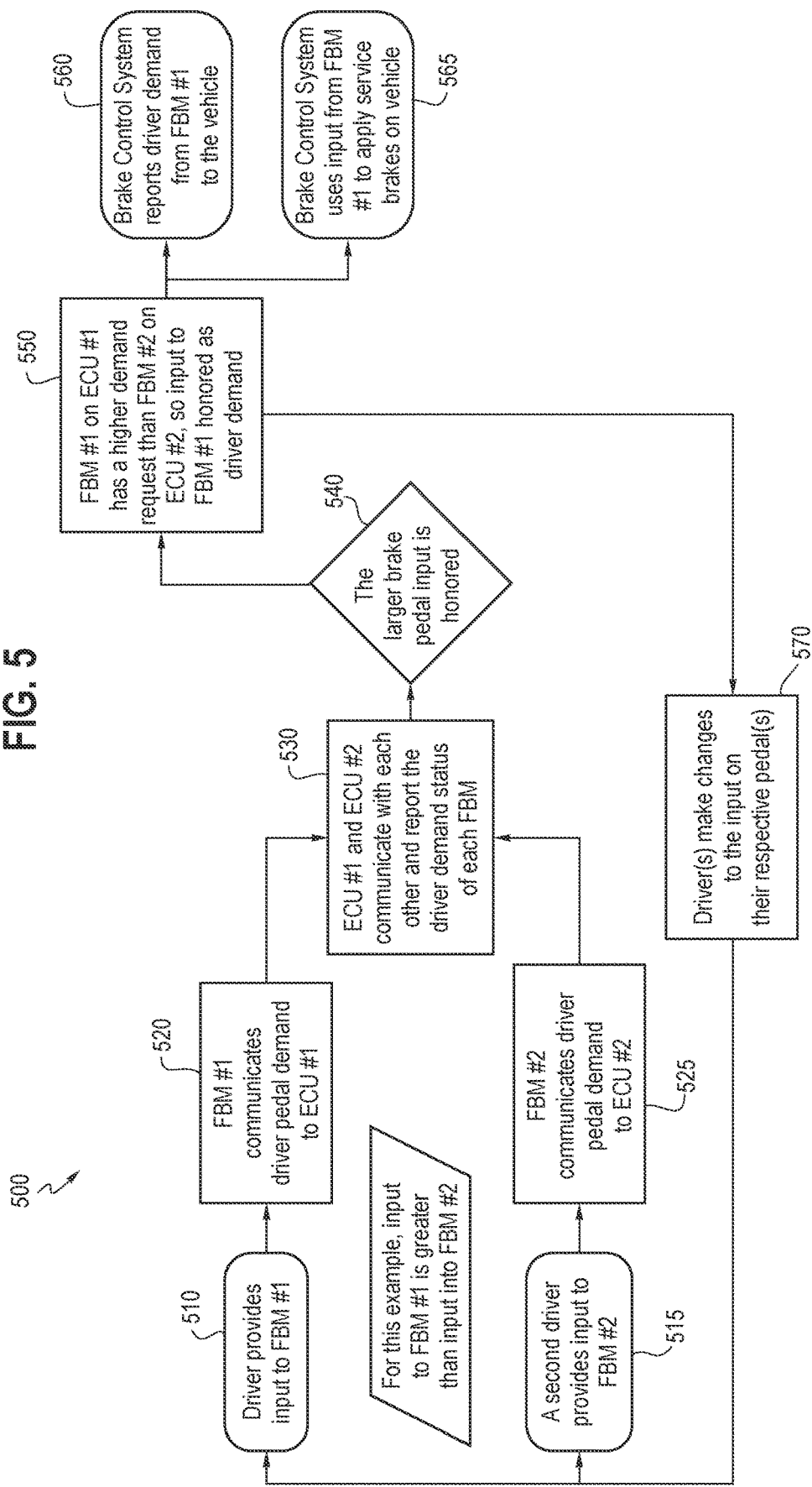
FIG. 5 is a flow chart of a method of an embodiment for arbitrating between two brake demand signals, where both brake demand signals request braking.

FIGS. 3, 4, and 5 are flow charts 300, 400, 500 that illustrate the operation of the braking control system 200. Turning first to FIG. 3, in this example, the driver is providing input to foot brake module (FBM) #1 (act 310) but not to FBM #2 (act 315). So, FBM #1 would communicate the driver pedal demand to the first brake controller (electronic control unit (ECU) #1) (act 320), and FBM #2 would communicate the lack of driver pedal demand to the second brake controller (ECU #2) (act 325). Next, ECU #1 and ECU #2 would communicate with each other and report the driver demand status of each FBM (act 330). The larger brake pedal input would be honored (act 340). (In this and other examples presented herein, the arbitration can be done by only one of the controllers or by both controllers independently of one another.) This means that FBM #1 on ECU #1 has a higher demand request than FBM #2 on ECU #2, so the input of FBM #1 is honored as the driver demand (act 350). So, the brake control system 200 would report the driver demand from FBM #1 to the vehicle (act 360) and use the input from FBM #1 to apply the service brakes on the vehicle (act 365). As the driver makes changes to the input on FBM #1 (act 370), the braking control system 200 would react to that.

FIG. 4 is similar to FIG. 3, but, in this situation, the driver is providing input to foot brake module (FBM) #2 (act 410) but not to FBM #1 (act 415). So, FBM #2 would communicate the driver pedal demand to the second brake controller (ECU #2) (act 420), and the FBM #1 would communicate the lack of driver pedal demand to the first brake controller (ECU #1) (act 425). Next, ECU #1 and ECU #2 would communicate with each other and report the driver demand status of each FBM (act 430). The larger brake pedal input would be honored (act 440). This means that FBM #2 on ECU #2 has a higher demand request than FBM #1 on ECU #1, so the input of FBM #2 is honored as the driver demand (act 450). So, the brake control system 200 would report the driver demand from FBM #2 to the vehicle (act 460) and use the input from FBM #2 to apply the service brakes on the vehicle (act 465). As the driver makes changes to the input on FBM #2 (act 470), the braking control system 200 would react to that.

In FIG. 5, the driver is providing input to foot brake module (FBM) #1 (act 510), and a second driver is providing input to FBM #2 (act 515). FBM #1 would communicate its driver pedal demand to the first brake controller (ECU #1) (act 520), and the FBM #2 would communicate its driver pedal demand to the second brake controller (ECU #2) (act 525). Next, ECU #1 and ECU #2 would communicate with each other and report the driver demand status of each FBM (act 530). The larger brake pedal input (here, from FMB #1) would be honored (act 540). This means that FBM #1 on ECU #1 has a higher demand request than FBM #2 on ECU #2, so the input of FBM #1 is honored as the driver demand (act 550). So, the brake control system 200 would report the driver demand from FBM #1 to the vehicle (act 560) and use the input from FBM #1 to apply the service brakes on the vehicle (act 565). As the drivers make changes to the inputs of FBM #1 and FBM #2 (act 570), the braking control system 200 would react to that.

Figure 6:
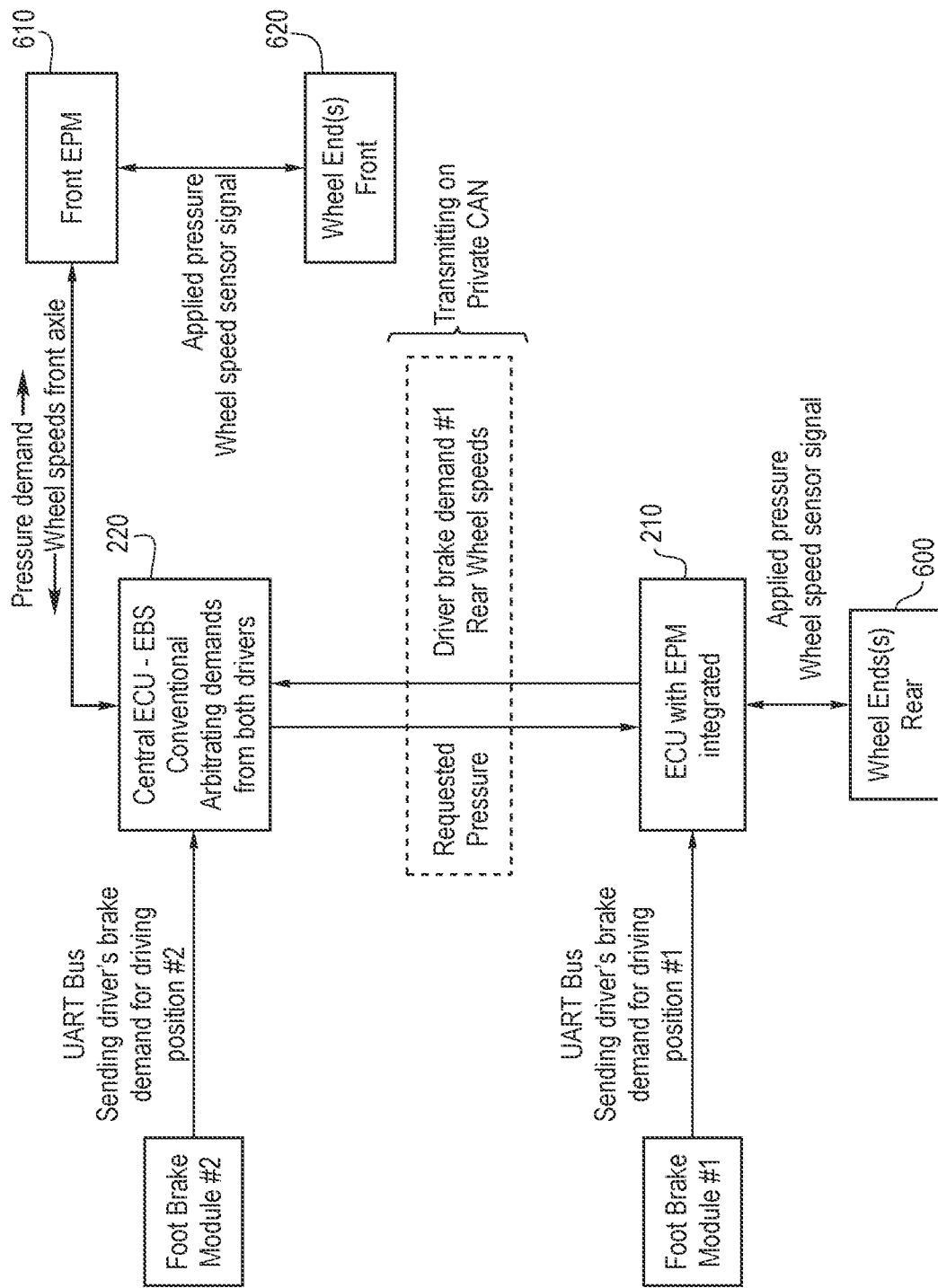
FIG. 6 is a block diagram of a braking control system of an embodiment having two different types of brake controllers.

As noted above, many alternatives are possible. For example, the first and second brake controllers 210, 220 can be the same type of controller, or they can be different types of controllers, as illustrated in FIG. 6. In the example shown in FIG. 6, the first brake controller 210 takes the form of an electronic control unit (ECU) that is integrated with an electro-pneumatic module (EPM), whereas the second brake controller 220 takes the form of an ECU with a conventional hardware/port configuration (however, as will be discussed below, the software/firmware of the ECU can be modified to provide signal arbitration functionality). In this situation, the EPM can be considered part of the braking system.

In one embodiment, an ECU with a conventional hardware/port configuration is a circuit board enclosed in a weatherproof housing that protects the circuitry from the elements and minor impact from road debris. The housing has a number of electrical connectors that allow wires to connect the circuit board with the other components in the vehicle (e.g., power, ground, and a J1939 controller area network (CAN) to communicate with other ECUs present in the vehicle, such as in the engine, transmission, dashboard, etc.). The electrical connectors can also connect the circuit board with the other components in the EBS (e.g., EPMs that electronically or mechanically deliver air to the wheel ends of the vehicle, modulators (dedicated components usually used on the steer axle to allow air to be rapidly released or held steady during anti-lock braking events), and a steer-angle sensor that indicates what the driver is telling the vehicle to do via the steering wheel). The ECU can also have internal sensors, such as an accelerometer to sense how the vehicle is behaving in space (e.g., to sense if the vehicle is yawing, speeding up, slowing down, etc.). Other configurations are possible.

In contrast, an ECU with an integrated EPM couples a stand-alone ECU (with some or all of the functions of the ECU noted above) with a two-channel EPM. Installing a conventional ECU on the top of a two-channel EPM eliminates the external connection to the EPM (external connections to other EPMs can be maintained as normal). In one implementation, the shape of the ECU with an integrated EPM is different than the shape of a conventional ECU to account for the different packaging. However, combining a conventional ECU with a two-channel EPM can save mounting space on the vehicle and simplify installation due to the elimination of some external wiring. Again, other configurations are possible.

Returning to FIG. 6, in operation, each of the foot brake modules (FBMs) provides its electronic brake demand signal to its respective brake controller 210, 220 via respective direct, point-to-point universal asynchronous receiver-transmitter (UART) buses. Also, the ECU with the integrated EPM 210 provides the electronic brake demand signals from the first FBM to the central ECU 210 over a communication channel (here, a private controller area network (CAN) according to ISO 11992 or J1939). The communication channel can also be used to transmit additional information, such as, but not limited to, wheel speeds. In this embodiment, the central ECU 220 has its software/firmware modified to arbitrate between the signals received from the first and second foot brake modules (the signal from the first foot brake module is received via the ECU with the integrated EPM 210). It should be noted that, in this embodiment, the central ECU 220 has a conventional hardware/port configuration, so the hardware of the central ECU 220 is not changed to include additional pins or ports to receive signals from an additional foot brake module. Only its software/firmware is modified to allow for the arbitration (here, to choose the greater brake demand, but other criterion can be used). This software development cost could be directly placed on the manufacturer of this special vehicle type and would be less expensive than redesigning new hardware and offering a completely unique system for this vehicle type. So, this embodiment provides the advantage of providing a reduced hardware design that avoids the complexity involved in redesigning hardware. Other implementations are possible.

The arbitration results in the selection of the higher brake demand signal. In many instances where there is only one driver of the vehicle, the arbitration is between a signal that indicates zero braking and a signal that indicates some amount of braking. However, when both brake pedals are pressed (e.g., when a passenger accidentally or intentionally presses the other brake), the arbitration would be between two signals that indicate some amount of braking. In either event, the arbitration can be an ongoing process at some predetermined or variable frequency.

In this embodiment, the central ECU 220 provides the greater signal to the ECU with the integrated EPM 210 (e.g., via private CAN messages), and both ECUS 210, 220 causes braking to occur per that greater signal to respective parts of the braking system. In the example shown in FIG. 6, the ECU with the integrated EPM 210 causes braking by calculating and communicating an applied pressure to the rear wheel ends 600. In contrast, the central ECU 220 does not have an integrated EPM, so it causes braking by communicating a pressure demand to a separate EPM 610, which calculates and communicates an applied pressure to the front wheel ends 620. It is important to note that this is just an example configuration and that other configurations can be used. For example, instead of each ECU 210, 220 communicating with different parts of the braking system, only one of the ECUs 210, 220 can do the all communicating. Other configurations are possible.

Figure 7:
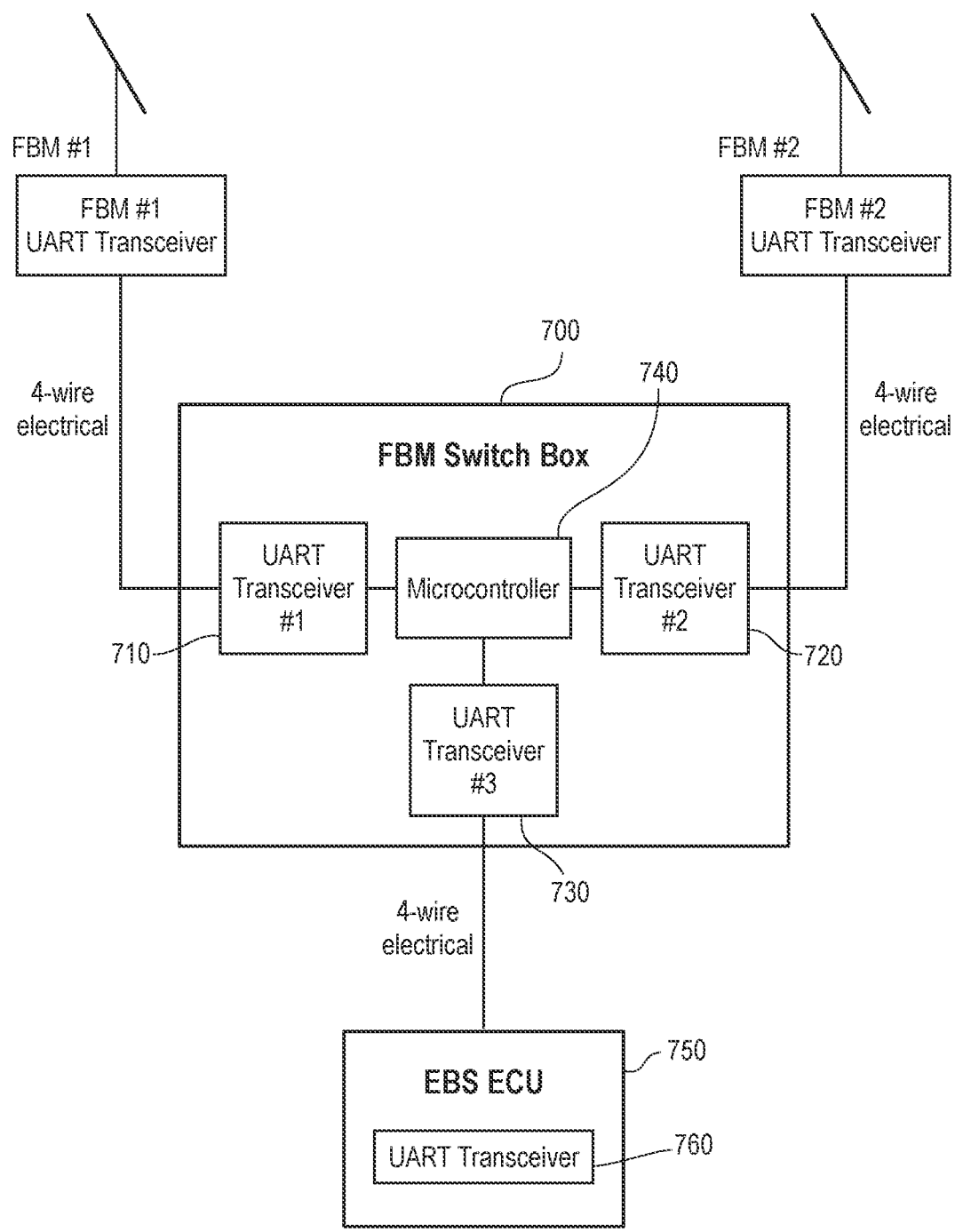
FIG. 7 is a block diagram of a foot brake module switch box of an embodiment.

There are many alternatives that can be used with these embodiments. For example, as shown in FIG. 7, instead of using two brake controllers, a single brake controller (ECU) 750 is used, and a switch box 700—not another brake controller—does the arbitration. More specifically, in this embodiment, each foot brake module (FBM) communicates with the switch box 700 using a four-wire electrical channel. The four wires represent power, ground, and two UART signals for the two opposing signals described above. The switch box 700 comprises three UART transceivers 710, 720, 730, which are used to communicate with FBM #1, FBM #2, and the controller 750, respectively. The switch box 700 also comprise a microcontroller (e.g., a processor) that arbitrates between the two brake demand signals provided by FBM #1 and FBM #2 to provide the higher of the two signals via the third UART transceiver 730 to a UART transceiver 760 in the controller 750 (e.g., to repeat the higher signal). From the controller's perspective, it is communicating with one device (the switch box 700), but that one device has two FBMs hidden behind it. Also, because the switch box 700 can repeat the opposing signals it receives from the FBMs, the switch box 700 preserves the error checking and fault functionality described above. If the switch box 700 fails and does not provide the opposing signals to the controller 750, it can be assumed that a non-EBS foot brake valve (FBV) without electronics is pneumatically connected to the system. The system can then go into pneumatic backup mode when that FBV is used to apply control pressure (because the EBS will not receive a corresponding electrical control demand).

Figure 8:
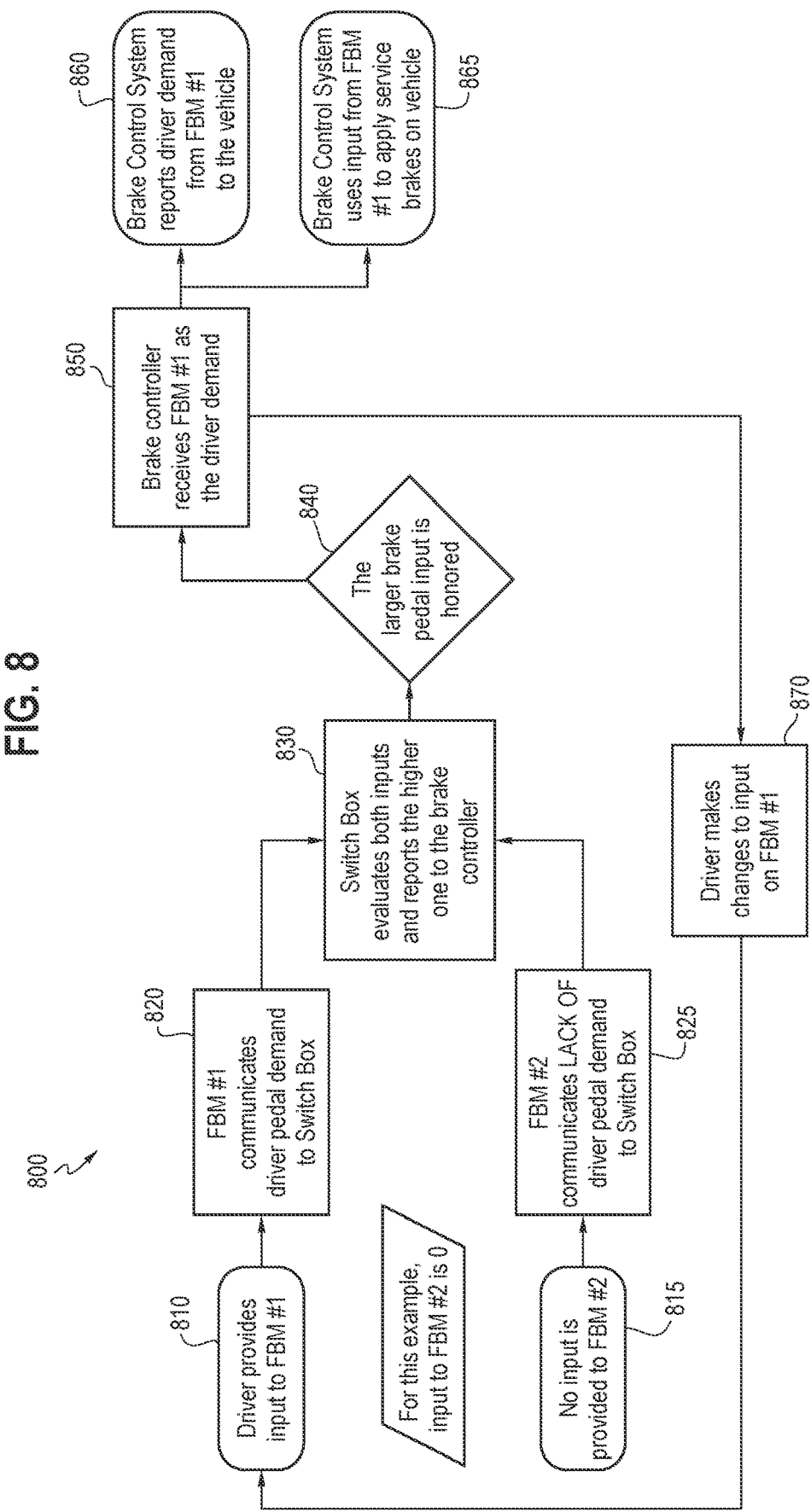
FIG. 8 is a flow chart of a method of an embodiment for arbitrating between two brake demand signals, where a brake demand signal from a second foot brake module requests zero braking.
Figure 9:
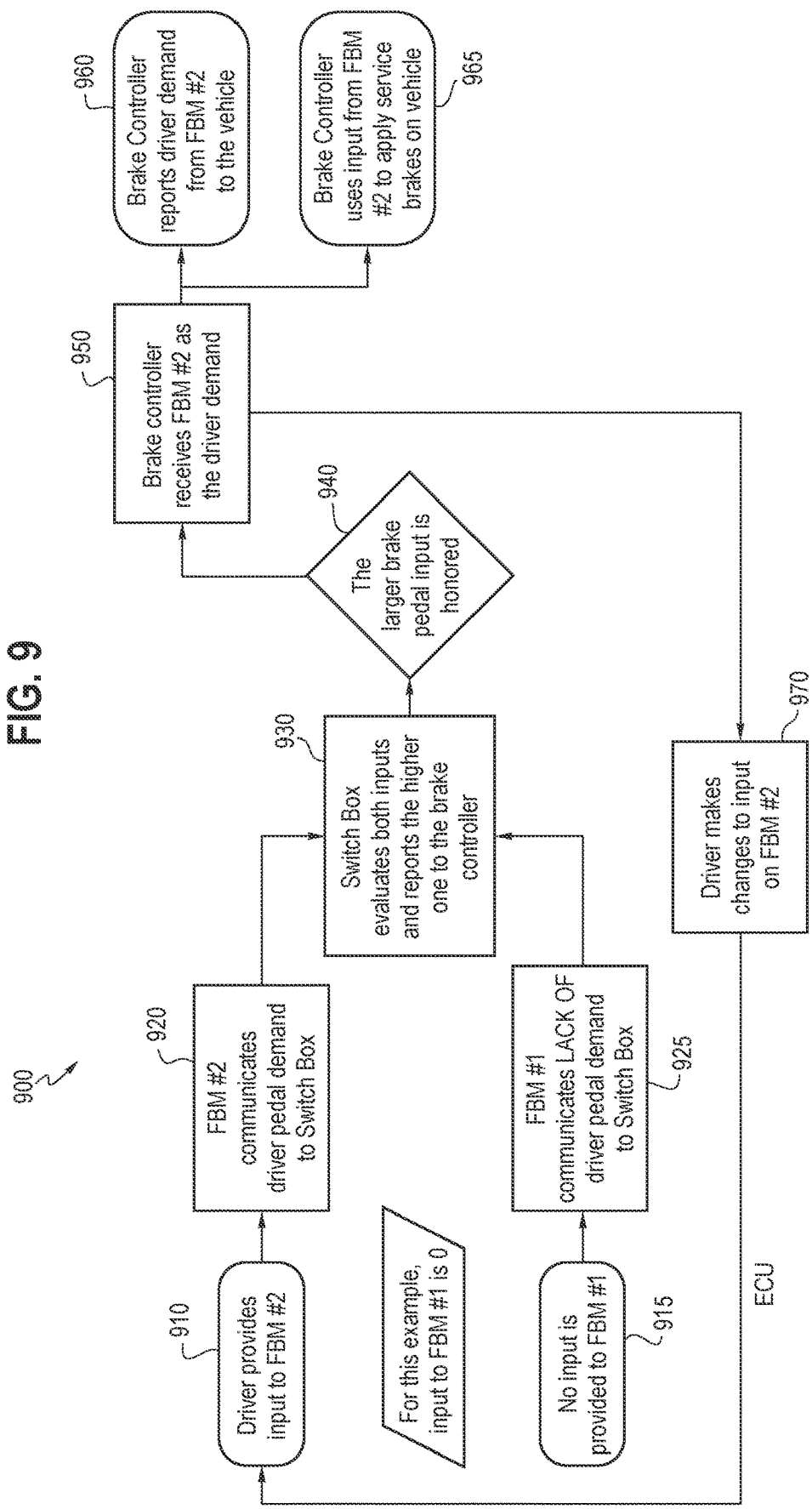
FIG. 9 is a flow chart of a method of an embodiment for arbitrating between two brake demand signals, where a brake demand signal from a first foot brake module requests zero braking.
Figure 10:
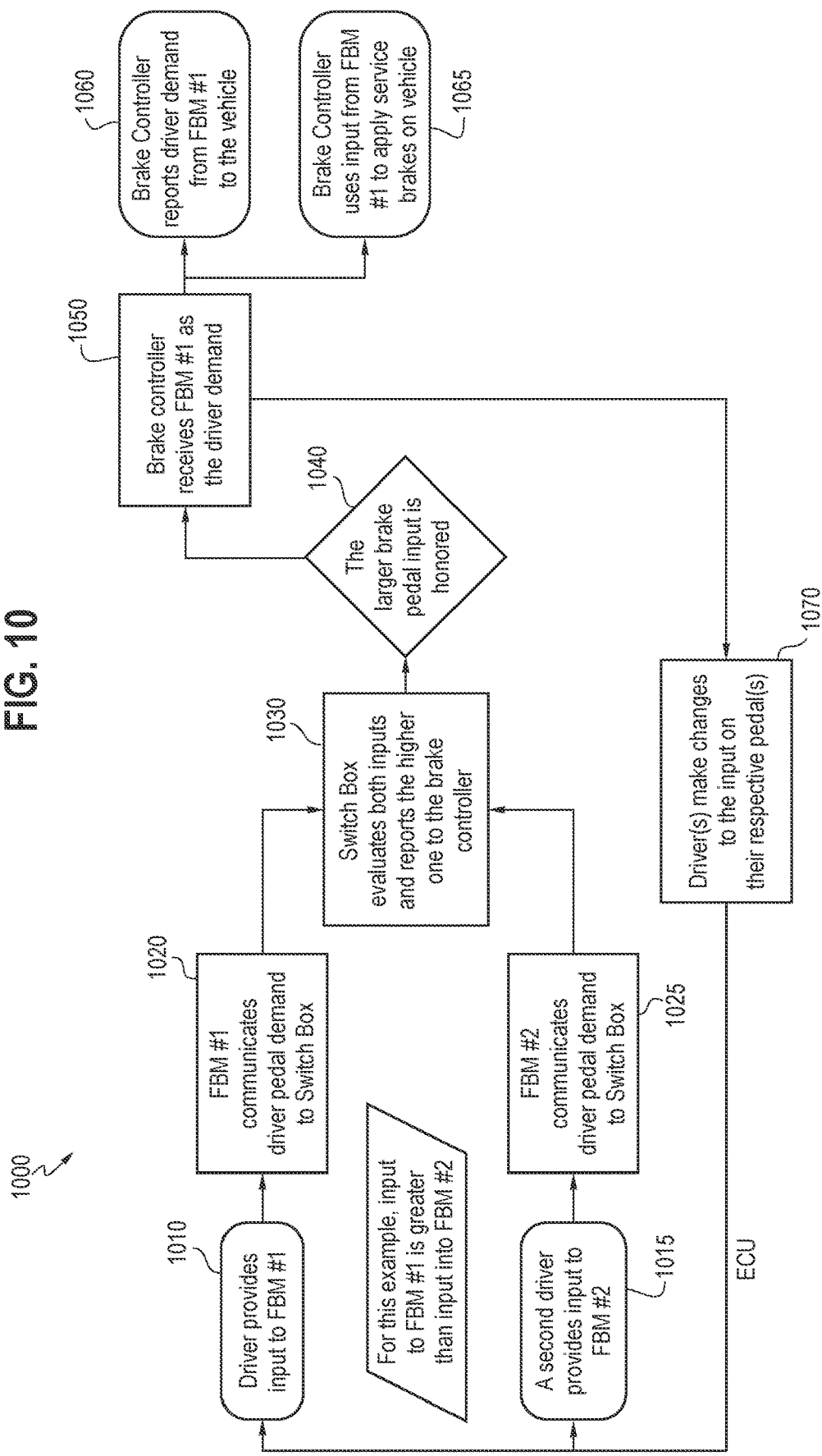
FIG. 10 is a flow chart of a method of an embodiment for arbitrating between two brake demand signals, where brake demand signals from two foot brake modules request braking.

FIGS. 8, 9, and 10 are flow charts 800, 900, 1000 that illustrate the operation of the FBM switch box 700 of this embodiment. Turning first to FIG. 8, in this example, the driver is providing input to foot brake module (FBM) #1 (act 810) but not to FBM #2 (act 815). So, FBM #1 would communicate the driver pedal demand to the switch box 700 (act 820), and the FBM #2 would communicate the lack of driver pedal demand to the switch box 700 (act 825). Next, the switch box 700 evaluates both inputs and reports the higher one to the brake controller 750 (act 830). In this way, the larger brake pedal input is honored (act 840). When the brake controller 750 receives the signal from FBM #1 as the driver demand (act 850), the brake controller 750 reports the driver demand from FBM #1 to the vehicle (act 860) and uses the input from FBM #1 to apply service brakes on the vehicle (act 865). As the driver makes changes to the input on FBM #1 (act 870), the switch box 700 would react to that.

FIG. 9 is similar to FIG. 8, but, in this situation, the driver is providing input to foot brake module (FBM) #2 (act 910) but not to FBM #1 (act 915). So, FBM #2 would communicate the driver pedal demand to the switch box 700 (act 920), and FBM #1 would communicate the lack of driver pedal demand to the switch box 700 (act 925). Next, the switch box 700 evaluates both inputs and reports the higher one to the brake controller 750 (act 930). In this way, the larger brake pedal input is honored (act 940). When the brake controller 750 receives the signal from FBM #2 as the driver demand (act 950), the brake controller 750 reports the driver demand from FBM #2 to the vehicle (act 960) and uses the input from FBM #2 to apply service brakes on the vehicle (act 965). As the driver makes changes to the input on FBM #2 (act 970), the switch box 700 would react to that.

In FIG. 10, the driver is providing input to foot brake module (FBM) #1 (act 1010), and a second driver is providing input to FBM #2 (act 1015). FBM #1 would communicate its driver pedal demand to the switch box 700 (act 1020), and FBM #2 would communicate its driver pedal demand to the switch box 700 (act 1025). Next, the switch box 700 evaluates both inputs and reports the higher one (here, from FBM #1) to the brake controller 750 (act 1040). In this way, the larger brake pedal input is honored (act 1040). When the brake controller 750 receives the signal from FBM #1 as the driver demand (act 1050), the brake controller 750 reports the driver demand from FBM #1 to the vehicle (act 1060) and uses the input from FBM #1 to apply service brakes on the vehicle (act 1065). As the driver makes changes to the input on FBM #1 or FBM #2 (act 1070), the switch box 700 would react to that.

There are several advantages associated with this embodiment. As with the above embodiment, this embodiment allows multiple FBMs to be used without hardware changes to the braking controller. However, as an additional advantage, this embodiment also avoids software changes to the braking controller, as the arbitration is done in a device external to the controller. Also, this embodiment is scalable to more than two brake pedals or actuators, and the software can be expanded to support future FBM sensor technology.

Further, this embodiment puts the cost of multi-driver applications on specific users without increasing cost to the base system.

Figure 11:
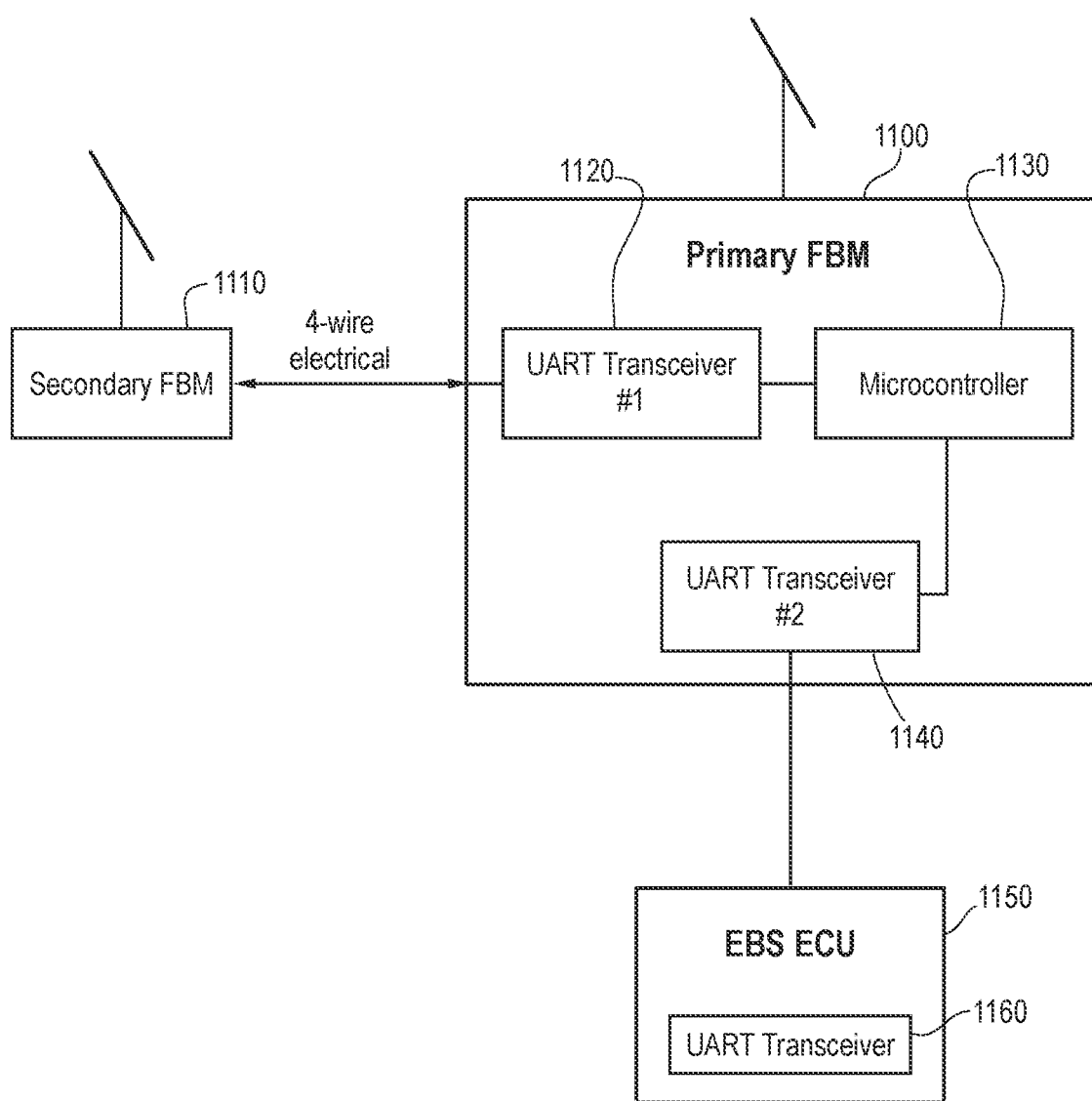
FIG. 11 is a block diagram of primary and secondary foot brake modules of an embodiment.

In yet another alternative, a single controller is still used, but, instead of using a switch box, the arbitration functionality is built-in to one of the foot brake modules (FBMs). This alternative is shown in FIG. 11. As shown in FIG. 11, in this embodiment, a secondary FBM is a standard FBM, but, instead of providing its output directly to the controller 1150, it provides its output to a primary FBM 1100. (From the perspective of the secondary FBM 1110, the primary FBM 1100 would be equivalent to the controller 1150.) The primary FBM 1100 contains the components of a standard FBM, as discussed above, but, in addition, contains a first UART transceiver 1120 for receiving the signal from the secondary FBM 1100 and a microcontroller (e.g., processor) 1130 configured to arbitrate between the brake demand signal received from the secondary FBM 1110 and the brake demand signal generated by the primary FBM 1100. The primary FBM 1100 outputs the larger of those two signals via a second UART transceiver 1140 to a UART transceiver 1160 in the controller 1150. Also, because the primary FMB 1100 can repeat the opposing signals it receives from the secondary FMB 1110, the primary FMB 1100 preserves the error checking and fault functionality described above. Of course, as with the embodiments above, other configurations and communication channels can be used.

Figure 12:
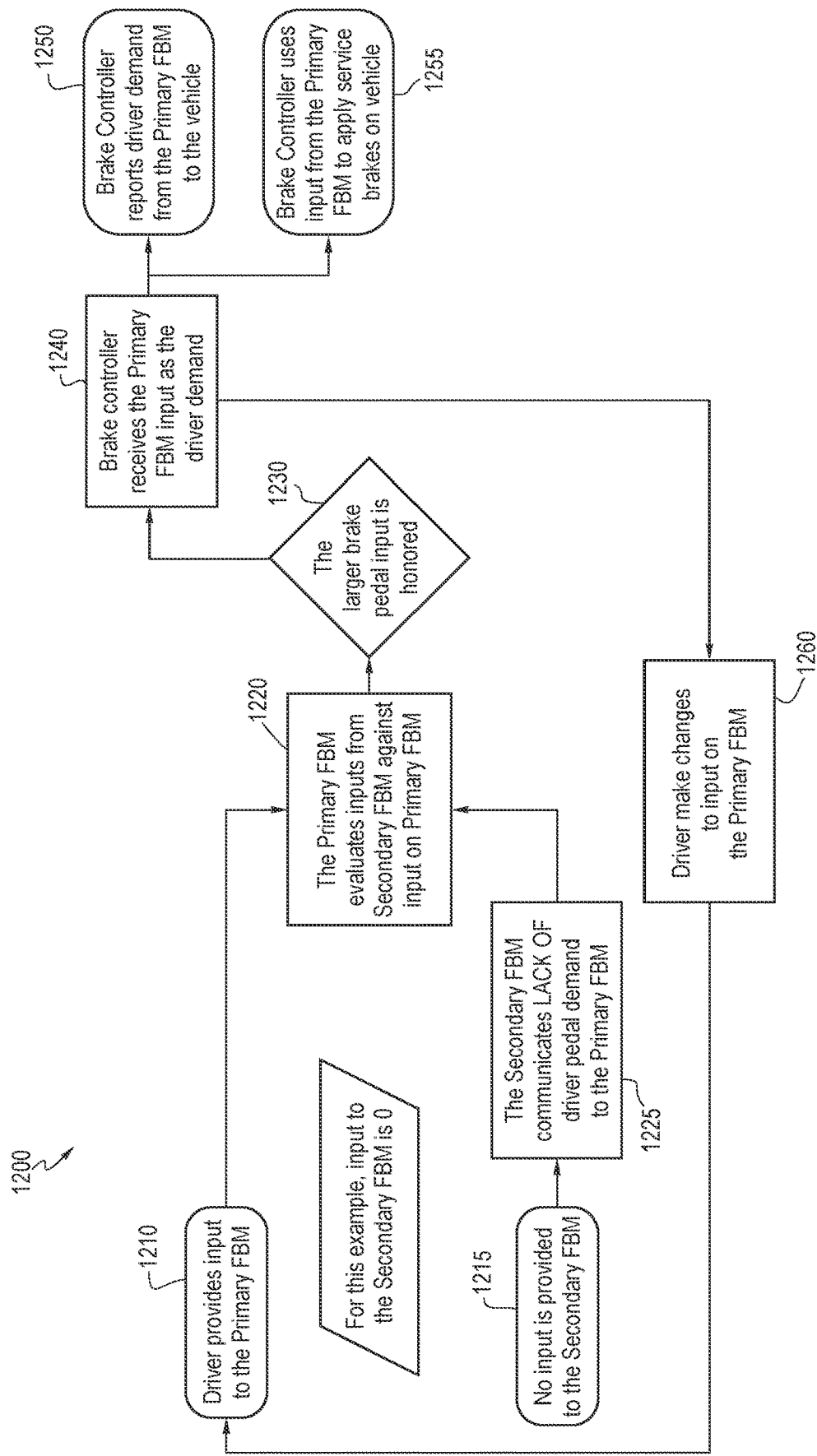
FIG. 12 is a flow chart of a method of an embodiment for arbitrating between two brake demand signals, where a brake demand signal from a secondary foot brake module requests zero braking.
Figure 13:
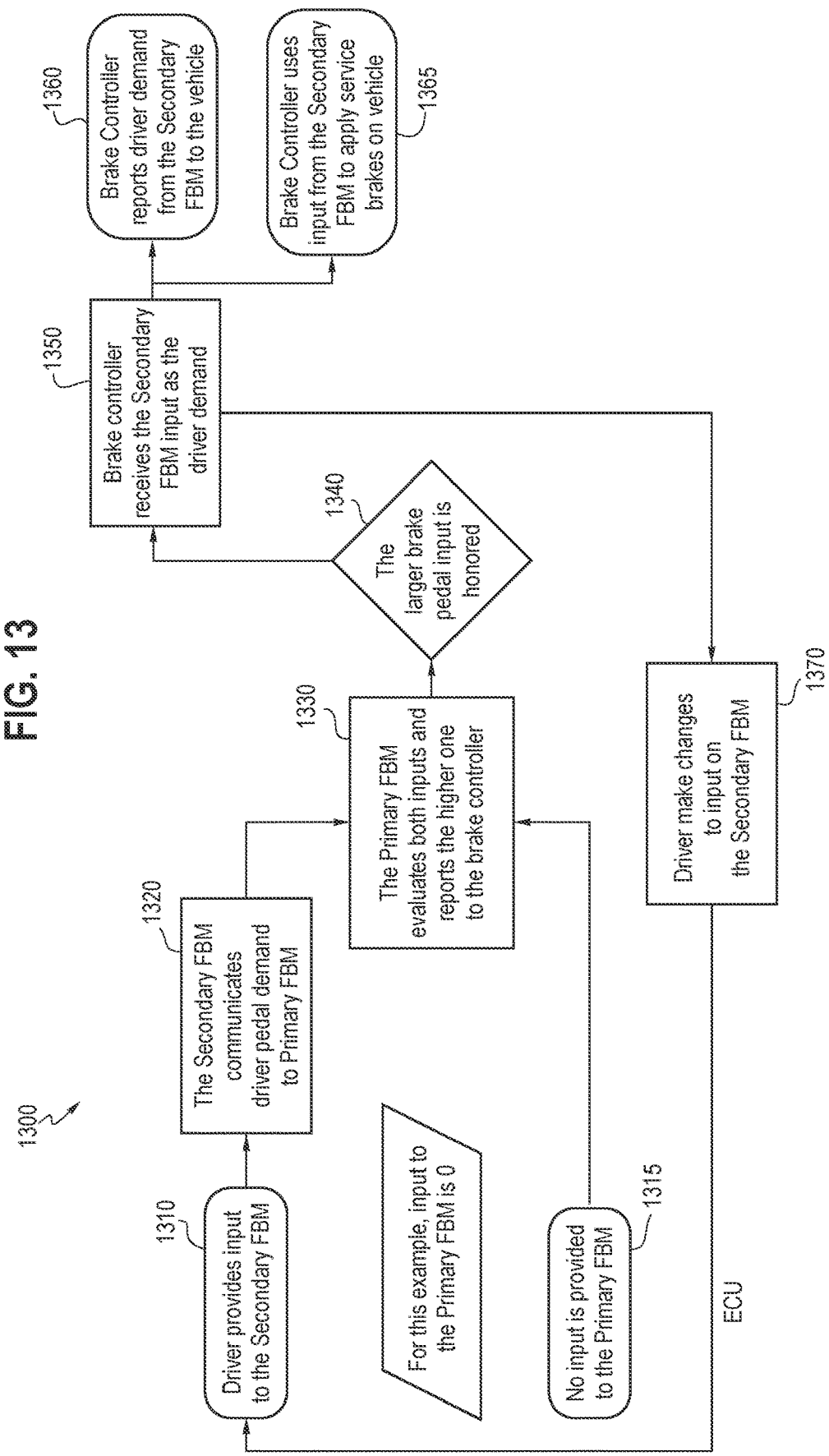
FIG. 13 is a flow chart of a method of an embodiment for arbitrating between two brake demand signals, where a brake demand signal from a primary foot brake module requests zero braking.
Figure 14:
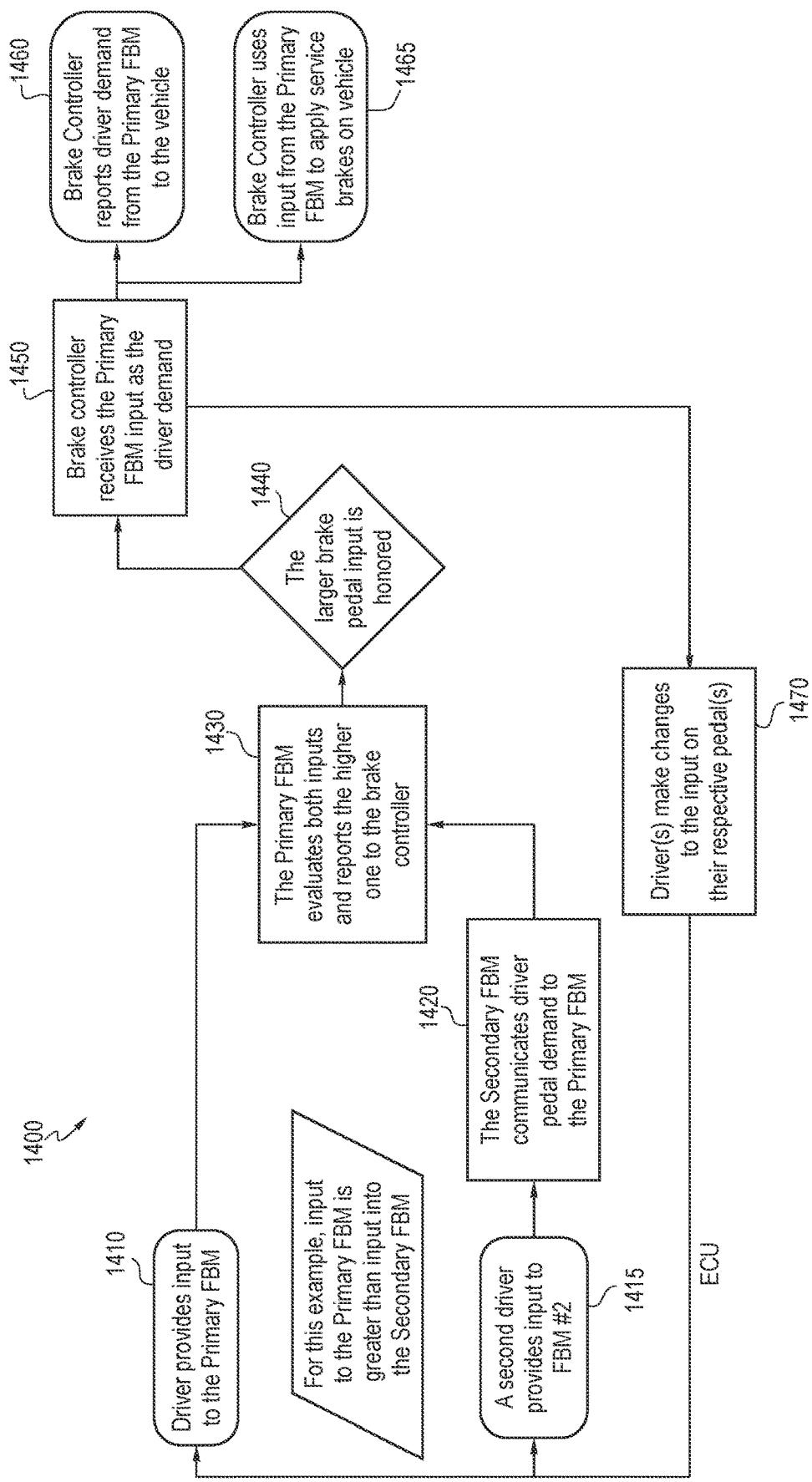
FIG. 14 is a flow chart of a method of an embodiment for arbitrating between two brake demand signals, where brake demand signals from primary and secondary foot brake modules request braking.

FIGS. 12, 13, and 14 are flow charts 1200, 1300, 1400 that illustrate the operation of the primary FBM. Turning first to FIG. 12, the driver provides input to the primary FBM 1100 (act 1210) but not to secondary FBM 1110 (act 1215). So, the secondary FBM 1110 would communicate the lack of driver pedal demand to the primary FBM 1100 (act 1225). Next, the primary FBM 1100 evaluates the driver signals from the primary and secondary FBMs 1100, 1110 (act 1220) and honors the larger one (act 1230). When the brake controller 1150 receives the larger signal from primary FBM 1110 (here, the larger signal is the one generated by the primary FBM 1110), the brake controller 1150 reports that driver demand to the vehicle (act 1250) and uses that to apply service brakes on the vehicle (act 1255). As the driver makes changes to the input on the primary FBM 1100 (act 1270), the primary FBM 1100 would react to that.

FIG. 13 is similar to FIG. 12, but, in this situation, the driver provide input to the secondary FBM 1110 (act 1310) but not to the primary FBM 1000 (act 1315). The secondary FBM 1110 communicates the driver pedal demand to the primary FBM 1100 (act 1320). Next, the primary FBM 1100 evaluates the driver demand from the primary and secondary FBMs 1100, 1110 (act 1330) and honors the larger one (act 1340). When the brake controller 1150 receives the larger signal from the primary FBM 1110 (here, the larger signal is the one generated by the second FBM 1110) (act 1350), the brake controller 1150 reports that driver demand to the vehicle (act 1360) and uses that to apply service brakes on the vehicle (act 1365). As the driver makes changes to the input on the secondary FBM 1110 (act 1370), the primary FBM 1100 would react to that.

In FIG. 14, the driver is providing input to the primary FBM 1100 (act 1410), and a second driver is providing input to the secondary FBM 1110 (are 1415). The secondary FBM 1110 communicates its driver pedal demand to the primary FBM 1100 (act 1420). Next, the primary FBM 1100 evaluates the driver demand from the primary and secondary FBMs 1100, 1110 (act 1430) and honors the larger one (act 1440). When the brake controller 1150 receives the larger signal from the primary FBM 1110 (here, the larger signal is the one generated by the primary FBM 1110) (act 1450), the brake controller 1150 reports that driver demand to the vehicle (act 1460) and uses that to apply service brakes on the vehicle (act 1465). As the driver makes changes to the input on the primary FBM 1100 (act 1470), the primary FBM 1100 would react to that.

There are several advantages associated with this embodiment. As with the above embodiment, this embodiment allows multiple FBMs to be used without hardware or software changes to the braking controller. Instead, hardware and software changes are made to one of the foot brake modules. Also, this embodiment is scalable to more than two brake pedals or actuators, and the software can be expanded to support future FBM sensor technology. Further, this embodiment puts the cost of multi-driver applications on specific users without increasing cost to the base system It should be understood that all of the embodiments provided in this Detailed Description are merely examples and other implementations can be used. Accordingly, none of the components, architectures, or other details presented herein should be read into the claims unless expressly recited therein. Further, it should be understood that components shown or described as being "coupled with" (or "in communication with") one another can be directly coupled with (or in communication with) one another or indirectly coupled with (in communication with) one another through one or more components, which may or may not be shown or described herein.

It is intended that the foregoing detailed description be understood as an illustration of selected forms that the invention can take and not as a definition of the invention. It is only the following claims, including all equivalents, which are intended to define the scope of the claimed invention. Accordingly, none of the components, architectures, or other details presented herein should be read into the claims unless expressly recited therein. Finally, it should be noted that any aspect of any of the embodiments described herein can be used alone or in combination with one another.

What is claimed is:

1. A braking control system comprising:
   a first brake controller configured to receive a first brake demand generated by a first brake pedal of a vehicle; and
   a second brake controller configured to receive a second brake demand generated by a second brake pedal of the vehicle;
   wherein:
      the first brake controller is further configured to provide the first brake demand to the second brake controller;
      the second brake controller is further configured to determine which of the first brake demand and the second brake demand is greater; and
      at least one of the first and second brake controllers is further configured to cause a braking system of the vehicle to decelerate the vehicle according to the greater brake demand.

2. The braking control system of claim 1, wherein the first brake controller and the second brake controller are each configured to accept a brake demand from only a single brake pedal.

3. The braking control system of claim 1, wherein:
   the second brake controller is further configured to provide the greater brake demand to the first brake controller; and the first and second brake controller are further configured to each cause different parts of the braking system to decelerate the vehicle according to the greater brake demand.

4. The braking control system of claim 1, wherein:
the second brake controller is further configured to provide the second brake demand to the first brake controller;
the first brake controller is further configured to determine the greater brake demand independently of the second brake controller's determination of the greater brake demand; and
the first and second brake controllers are further configured to each cause different parts of the braking system to decelerate the vehicle according to the greater brake demand.

5. The braking control system of claim 1, wherein only one of the first and second brake controllers is further configured to cause the braking system to decelerate the vehicle according to the greater brake demand.

6. The braking control system of claim 1, wherein the first and second brake controllers are further configured to communicate with each other over a private controller area network (CAN).

7. The braking control system of claim 1, wherein at least one of the first and second brake controllers is integrated with an electro-pneumatic module (EPM).

8. The braking control system of claim 1, wherein the first and second brake controllers are different types of controllers.

9. The braking control system of claim 1, wherein the first brake pedal is part of a first foot brake module and the second brake pedal is part of a second foot brake module.

10. The braking control system of claim 9, wherein the first and second foot brake modules are configured to communicate with the first and second brake controllers via respective universal asynchronous receiver-transmitter (UART) links.

11. The braking control system of claim 9, wherein the first and second foot brake modules are each configured to generate opposing signals used for error detection.

12. The braking control system of claim 1, wherein at least one of the first brake demand and the second brake demand requests zero braking.

13. A method comprising:
performing the following in a braking control system comprising a plurality of controllers in point-to-point communication with a respective plurality of foot brake modules of a vehicle:
receiving a plurality of brake demand signals from the plurality of foot brake modules:
arbitrating the plurality of brake demand signals to select one of the plurality of brake demand signals; and
causing the vehicle to decelerate according to the selected one of the plurality of brake demand signals.

14. The method of claim 13, wherein each of the plurality of controllers is configured to communicate with only one of the plurality of foot brake modules.

15. The method of claim 13, wherein the plurality of controllers communicate with each other over a private controller area network (CAN).

16. The method of claim 13, wherein at least one of the plurality of controllers is integrated with an electro-pneumatic module (EPM).

17. A braking control system comprising:
means for receiving first and second brake demand signals received from first and second brake pedals of a vehicle; and
means for selecting and applying a greater of the first and second brake demand signals to a braking system of the vehicle.

18. The braking control system of claim 17, wherein the means for receiving comprises universal asynchronous receiver-transmitter (UART) buses.

19. The braking control system of claim 17, wherein the means for selecting and applying comprises first and second controllers.

20. The braking control system of claim 19, wherein the at least one of the first and second controllers is integrated with an electro-pneumatic module (EPM).

* * * * *